(12) United States Patent
Travis (10) Patent No.: US 10,025,089 B2
(45) Date of Patent: Jul. 17, 2018

(54) BACKLIGHT FOR VIEWING THREE-DIMENSIONAL IMAGES FROM A DISPLAY FROM VARIABLE VIEWING ANGLES

(71) Applicant: Microsoft Corporation, Redmond, WA (US)

(72) Inventor: Adrian Travis, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 599 days.

(21) Appl. No.: 13/645,528

(22) Filed: Oct. 5, 2012

(65) Prior Publication Data

US 2014/0098010 A1    Apr. 10, 2014

(51) Int. Cl.
| | |
|---|---|
| G02B 26/00 | (2006.01) |
| G09G 3/00 | (2006.01) |
| G02B 26/10 | (2006.01) |
| G02B 27/22 | (2018.01) |
| G02B 27/00 | (2006.01) |
| F21V 8/00 | (2006.01) |

(52) U.S. Cl.
CPC ......... *G02B 26/005* (2013.01); *G02B 6/0031* (2013.01); *G02B 26/105* (2013.01); *G02B 27/0093* (2013.01); *G02B 27/2264* (2013.01); G02B 2207/115 (2013.01)

(58) Field of Classification Search
CPC .... G03F 7/70316; G09G 3/002; G02B 26/005
USPC .......................................... 345/32, 102, 156
See application file for complete search history.

(56) References Cited

U.S. PATENT DOCUMENTS

| | | | | |
|---|---|---|---|---|
| 5,544,268 | A | * | 8/1996 | Bischel et al. ...................... 385/4 |
| 5,699,462 | A | * | 12/1997 | Fouquet ............... G02B 6/3538 347/1 |
| 6,864,862 | B2 | | 3/2005 | Sato et al. |
| 7,167,616 | B2 | * | 1/2007 | Ling et al. ...................... 385/37 |
| 7,515,340 | B1 | | 4/2009 | Shiu |
| 8,233,204 | B1 | * | 7/2012 | Robbins et al. ................ 359/15 |

(Continued)

FOREIGN PATENT DOCUMENTS

| | | |
|---|---|---|
| CN | 1534312 A | 10/2004 |
| TW | 201232203 A | 8/2012 |

(Continued)

OTHER PUBLICATIONS

"LCD Panels Display 3D Without Glasses", Retrieved at <<http://electronicdesign.com/article/components/lcd-panels-display-3d-without-glasses20454>>, Jul. 1, 2009, pp. 2.

(Continued)

*Primary Examiner* — Kent Chang
*Assistant Examiner* — Scott Au (57) ABSTRACT

A display system produces three-dimensional images. The display system includes a waveguide, and a light source that injects light into the waveguide. A switchable grating allows individual positions in the grating in a two-dimensional array to be turned on and off. A controller configured to spatially modulate the switchable grating so as to control where light exits the waveguide. An eye tracking module tracks eye position of a viewer. The controller uses the eye position to control switching of the grating.

28 Claims, 6 Drawing Sheets

(56) References Cited

U.S. PATENT DOCUMENTS

| | | | |
|---|---|---|---|
| 8,743,464 B1* | 6/2014 | Amirparviz | G02B 27/01 359/633 |
| 2003/0012483 A1 | 1/2003 | Ticknor et al. | |
| 2003/0048237 A1 | 3/2003 | Sato et al. | |
| 2004/0246391 A1* | 12/2004 | Travis | 349/6 |
| 2007/0008619 A1 | 1/2007 | Cha et al. | |
| 2010/0134534 A1 | 6/2010 | Seesselberg | |
| 2010/0231566 A1* | 9/2010 | Feenstra | G02B 26/005 345/211 |
| 2012/0044572 A1* | 2/2012 | Simmonds | G02B 6/0038 359/630 |
| 2012/0062850 A1 | 3/2012 | Travis | |
| 2012/0249537 A1 | 10/2012 | Bae et al. | |
| 2013/0135588 A1* | 5/2013 | Popovich et al. | 353/8 |
| 2013/0141405 A1* | 6/2013 | Huitema et al. | 345/205 |

FOREIGN PATENT DOCUMENTS

| | | |
|---|---|---|
| WO | 2011126554 A1 | 10/2011 |
| WO | WO2012085045 | 6/2012 |
| WO | 2012102802 A1 | 8/2012 |

OTHER PUBLICATIONS

Delaney, Ben, "Forget the Funny Glasses", Retrieved at <<http://ieeexplore.ieee.org/stamp/stamp.jsp?tp=&arnumber=1438253>>, IEEE Computer Graphics and Applications, vol. 25, Issue 3, May 2005, pp. 6.

Oguchi, et al., "Micromachined Display Device Using Sheet Waveguide and Multicantilevers Driven by Electrostatic Force", Retrieved at <<http://ieeexplore.ieee.org/stamp/stamp.jsp?tp=&arnumber=1490688&userType=inst>>, IEEE Transactions on Industrial Electronics, vol. 52, No. 4, Aug. 2005, pp. 8.

Pollack, et al., "Electrowetting-based Actuation of Liquid Droplets for Microfluidic Applications", Retrieved at <<http://microfluidics.ee.duke.edu//documents/apl-pollack.pdf>>, In Applied Physics Letters, vol. 77, No. 11, Sep. 11, 2009, pp. 2.

"Scanning Collimation of Light Via Flat Panel Lamp", U.S. Appl. No. 61/235,928, filed Aug. 21, 2009, pp. 9.

Travis et al., "The design of backlights for view-sequential 3D", Retrieved at <<https://wwww.microsoft.com/en-us/research/publication/design-backlights-view-sequential-3d/>>.

Shieh et al., "Micro-optics Components for Liquid Crystal Displays Application", Retrieved at <<http://citeseerx.ist.psu.edu/viewdoc/download?doi=10.1.1.706.2973&rep=repl&type=pdf>>.

"International Preliminary Examination Report" for PCT Patent Application No. PCT/US2013/060241, dated Apr. 19, 2015.

"First Office Action and Search Report Issued in Chinese Patent Application No. 201380052154.9", dated May 23, 2016, 12 Pages.

"Second Office Action Issued in Chinese Patent Application No. 201380052154.9", dated Nov. 21, 2016, 9 Pages.

"Third Office Action and Search Report Issued in Chinese Patent Application No. 201380052154.9", dated Jun. 2, 2017, 10 Pages.

"Fourth Office Action Issued in Chinese Patent Application No. 201380052154.9", dated Dec. 4, 2017, 7 Pages.

"International Search Report & Written Opinion for PCT Patent Application No. PCT/US2013/060241", dated Apr. 9, 2014, Filed Date: Sep. 18, 2013, 11 Pages.

Office Action Issued in European Patent Application No. 13776875.0, dated Feb. 2, 2018. 4 pages.

* cited by examiner

BACKLIGHT FOR VIEWING THREE-DIMENSIONAL IMAGES FROM A DISPLAY FROM VARIABLE VIEWING ANGLES

BACKGROUND

Three-dimensional images, such as those seen in motion pictures, typically are viewable due to spectacles that are worn by each viewer. Three-dimensional displays produce a left eye and right eye view of a three-dimensional image. The viewer wears spectacles which block light to one eye when the view intended for the other eye is displayed.

SUMMARY

This Summary is provided to introduce a selection of concepts in a simplified form that are further described below in the Detailed Description. This Summary is intended neither to identify key features or essential features of the claimed subject matter, nor to be used to limit the scope of the claimed subject matter.

The use of spectacles can be avoided by providing a display with a waveguide and a switchable grating. The combination of waveguide and switchable grating concentrates rays into the left eye, then the right eye, in rapid alternating succession to avoid flicker.

In one implementation, light from a laser is injected via a scanner into the edge of a slab waveguide. A spatial array of switchable gratings controllably ejects light from the waveguide. In one implementation, the grating can be made switchable by using an electric field to draw index-matching fluid into a gap between the grating and the waveguide.

Thus, to provide a three-dimensional display, the angle at which the laser beam is injected into a slab waveguide is controlled, and the diffractive efficiency of gratings across the surface of the waveguide is spatially modulated. The gratings may be switched on and off by using an electric field to draw up an index matching fluid between the grating and the waveguide. The fraction of grating introduced at each pixel may be used to create an image, or the guide may be used as a backlight for a liquid crystal display.

By using a scanning mirror to set the launch angle of a ray at the edge of the waveguide and by switching on a grating at a desired position for the ray to emerge, one can control the position, angle and intensity of a ray anywhere on the surface of the device. This configuration allows a three-dimensional image to be time-multiplexed.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

The following section provides an example operating environment in which a display system, including a combination of a waveguide and switchable grating, can be implemented.

Figure 1:
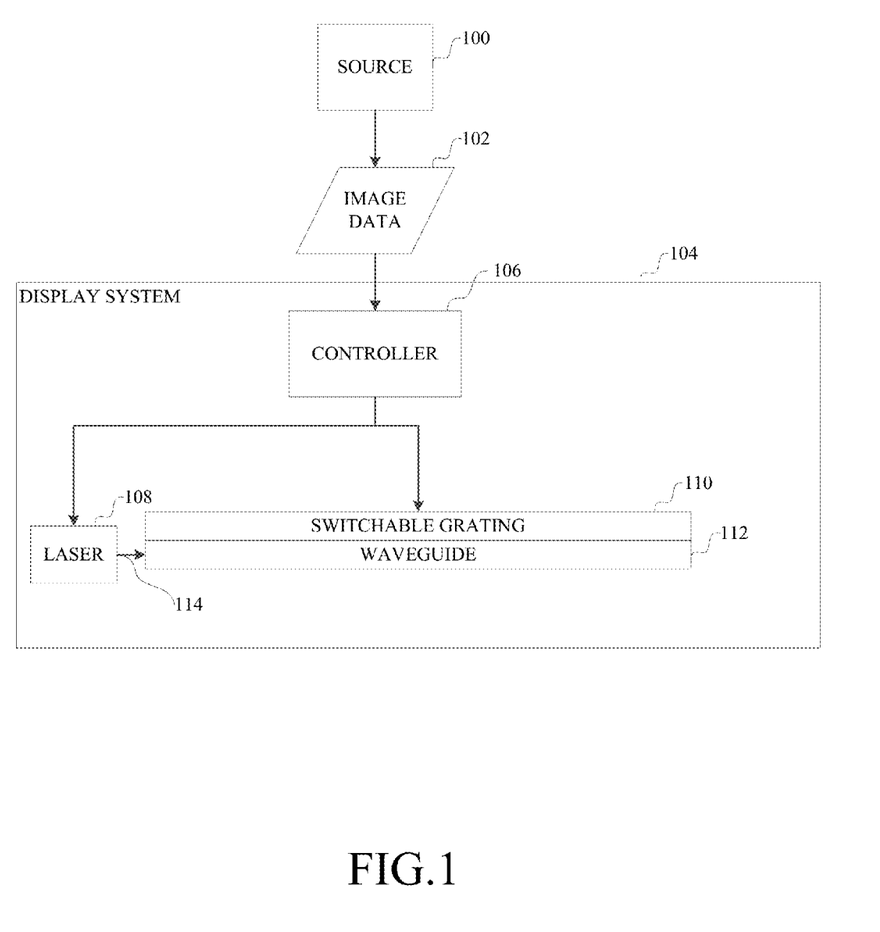
FIG. 1 is a block diagram of an example operating environment for a three-dimensional display.

Referring to FIG. 1, one or more sources 100 provide image data 102 to a display system 104 for display. The source can be any image generating appliance that generates image data for three-dimensional viewing. As an example, source 100 can include, but is not limited to, an application on a computing device, such as described below in connection with FIG. 7, that is presenting three-dimensional images. As another example, source 100 can include a playback device, such as a DVD player, which plays back video data from a storage medium to a display.

Image data 102 can include one or more images, including a sequence of images intended to be played back as motion video. Each image has data to be presented to both left and right eyes to provide a three dimensional viewing environment, and can be represented using two-channels of data, namely left and right.

The display system 104 includes a controller 106 that, given image data 102, controls both how light 114 from a laser 108 is injected into the wave guide 112, and how the grating 110 is switched, so that the images displayed to the user appear to have three-dimensions.

It should be understood that the controller 106 can be implemented on a computing device (such as described below in connection with FIG. 7) that is connected to a display, or can be incorporated into a display. The display system 104 can take a variety of forms, including but not limited to a display on a computing device, such as a mobile phone or laptop computer display, or a standalone display, such as a desktop display, wall-mounted display or table mounted display, or any other device connected to any of a variety of image generating appliances. A housing for the display can include the controller or the controller can be provided in a separate computing device connected to the display.

Figure 2:
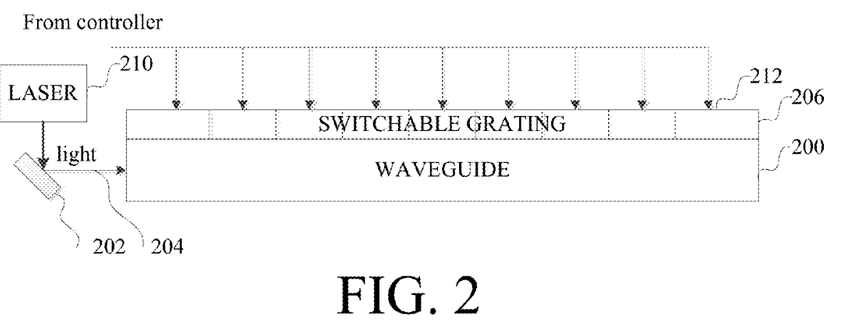
FIG. 2 is a diagram illustrating an example implementation of a display device.

Referring now to FIG. 2, more details of the display device will now be described. The display device includes a waveguide 200, such as a slab waveguide, which can be made of glass or other material on which transistors can be formed. A scanning mirror 202 directs light 204 from a laser 210 into the waveguide 200. A switchable grating 206 controls the reflection of the light 204 to cause the light to exit the waveguide. In one implementation, a grating can be embossed on the waveguide. The grating is structured to diffract light in one direction at any point in time. The switchable grating is a grating comprised on multiple portions 212, each of which is individually addressable at a position along the waveguide and can be either on or off. When the grating is off at a position along the waveguide, the light remains guided through the waveguide at that position. When the grating is on at a position along the waveguide, the light is diffracted out of the waveguide at that position. Thus, the waveguide and the switchable grating combine to provide a linearly addressable device that can control where light is diffracted out of the waveguide. An array of such devices can be used to provide a two-dimensional display.

An example implementation of the display device will be described in more detail in connection with FIGS. 3-4.

The switchable grating, in one implementation, uses a technique of moving fluid between plates of a capacitor by applying a voltage to those plates. In another implementation, a technique of moving fluid called "electro-wetting" can be used. An implementation of electrowetting using a dye is described in M. G. Pollack, R. B. Fair and A. D. Shenderov, "Electrowetting-based actuation of liquid droplets for microfluidic applications", *Applied Physics Letters*, Vol. 77, pp. 1725-6, 2000. Instead of using a dye, a change in refractive index can be brought about by the presence or absence of the fluid which causes light to be diffracted by the grating or not.

Figure 3:
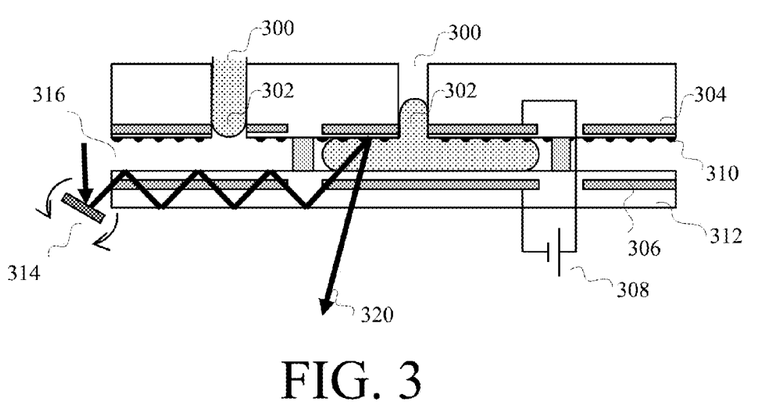
FIG. 3 is a more detailed schematic diagram illustrating an example implementation of a display device.

As shown in FIG. 3, such a switchable grating includes, for each addressable position in the grating, a reservoir 300 that contains a fluid 302. On the left, the fluid 302 is in the reservoir 300; on the right, the fluid 302 is in the gap. The fluid is index-matching in that the fluid has a refractive index that matches the refractive index of the waveguide. The fluid can be, for example, a material commonly used is such electro-wetting applications, such as an oil, water, or very high index fluid. In the absence of the fluid, the gap may be filled with air, or an oil or liquid with a different refractive index from that of the fluid. An example fluid is GE/Bayer SF1555 silicone which as a refractive index of 1.47. A gap is provided between a grating 310 and waveguide 312. The grating can be an ultraviolet light curing acrylic which is embossed using a mold on the waveguide (which can be glass) and illuminated with ultraviolet light before the mold is removed. The grating is structured to diffract a guided ray in one direction at any point in time. A scanning mirror 314 injects light into the edge of the waveguide, and controls the angle of injection. Transparent conductors 304 and 306 are positioned on either side of the gap. As an example, the conductors can be made of indium tin oxide, with a thickness of about ten microns and a width of one millimeter.

The conductors 304 and 306 are connected to a voltage source 308. According to a voltage applied by the voltage source to the transparent conductors, the grating is switched on or off.

FIG. 3 illustrates one implementation in which a grating is turned on by drawing a fluid into the gap. In particular, when the grating is off, the fluid is retained outside of the gap in the reservoir. The light is then guided down the wave guide. When the grating is on, the fluid is drawn into the gap. Light exits the waveguide, passes through the fluid and reflects off the grating, and is directed out of the display, as indicated at 320.

Figure 4:
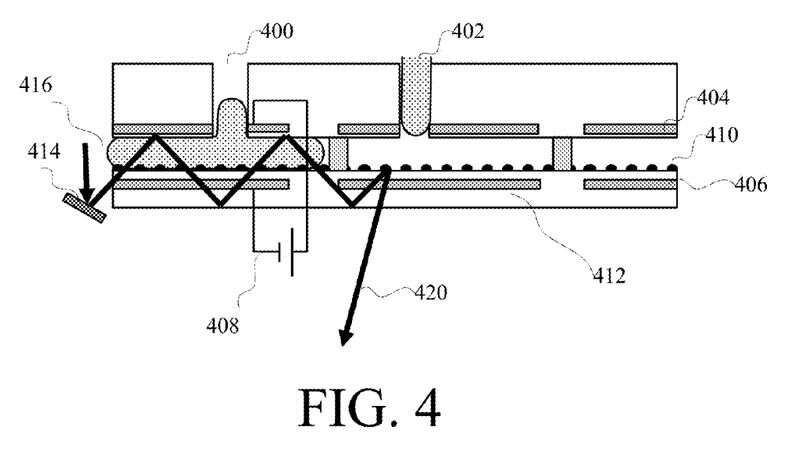
FIG. 4 is a more detailed schematic diagram illustrating another example implementation of a display device.

In FIG. 4, the switchable grating includes, for each addressable position in the grating, a reservoir 400 that contains a fluid 402. Transparent conductors 404 and 406 are positioned on either side of a gap. A grating 410 and waveguide 412 are positioned on one side of the gap. A scanning mirror 414 injects light into the edge of the waveguide, and controls the angle of injection. The conductors 404 and 406 are connected to a voltage source 408.

FIG. 4 illustrates another implementation in which a grating is turned on by drawing fluid out of the gap. In this implementation, the fluid is index-matching in that the fluid has a refractive index that matches the refractive index of the grating. In particular, when the grating is off, the fluid is drawn into the gap. The light can exit the waveguide, passing through the grating and the fluid, and reflecting back in to the waveguide. The light is guided down the wave guide. When the grating is on, the fluid is drawn out of the gap. Light exits the waveguide, and reflects off the grating, to be directed out of the display, as indicated at 420.

In these implementations, the scanning mirror (e.g., 314, 414) allows a launch angle of a ray of light at the edge of the waveguide to be set. The switchable grating allows the position to be set where the ray is to emerge. Thus, the scanning mirror and switchable grating allow control of the position, angle and intensity of a ray of light anywhere on the surface of this device. Controlling these parameters allows a three-dimensional image to be time-multiplexed on this device.

Figure 5:
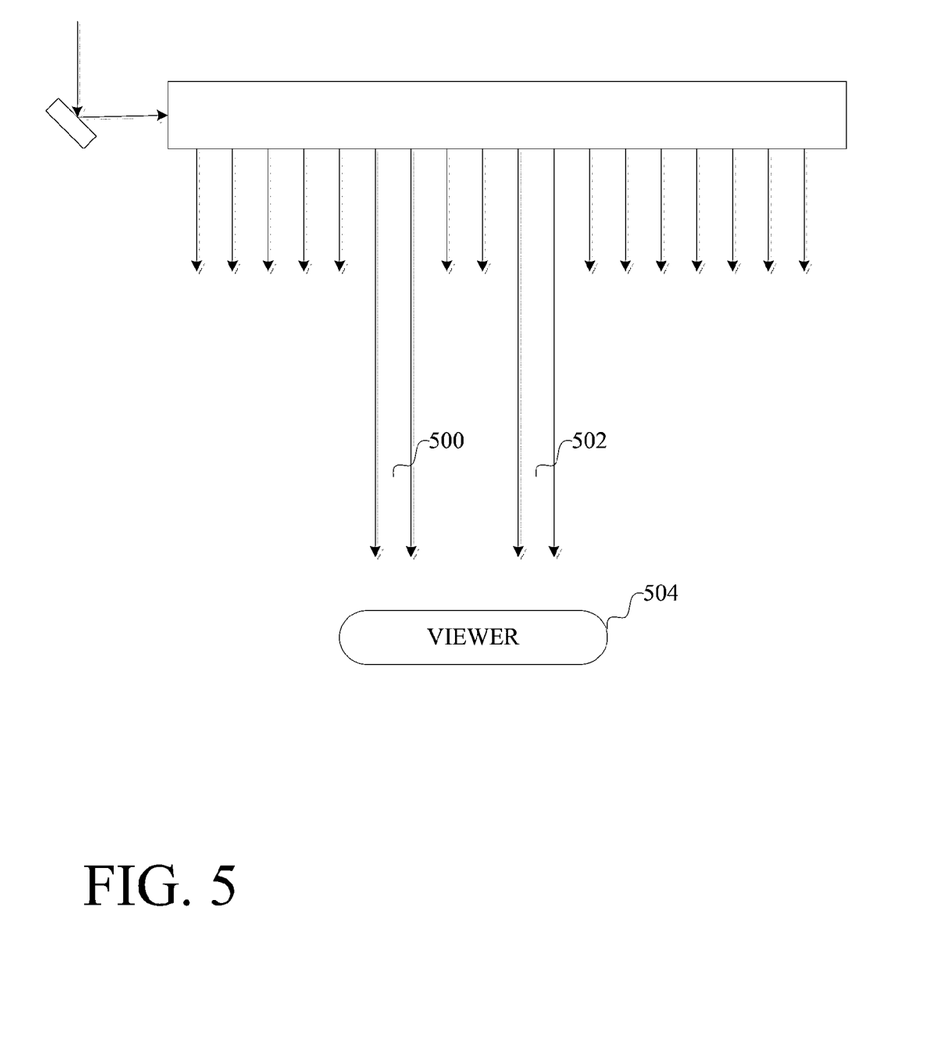
FIG. 5 is a diagram of how light is directed at a viewer's eyes.

Accordingly, given image data that includes data for left and right images, the scanning mirror and switchable grating can be controlled so as to present an image. The electrowetting-based switchable grating can allow a change in state of a grating every 1 to 2 milliseconds. To reduce the amount of data used to display the image, it is possible to modulate only rays likely to enter the pupil of each eye of a viewer 504, such as illustrated in FIG. 5 at 500 and 502. In particular, if rays leave the light-guide in parallel, only rays 500 and 502 from a small region of the waveguide will enter a pupil of a viewer 504 at any instant. If the gratings in this small region are on at that instant, then the viewer will see the corresponding image. The intensity of the ray can be modulated as its angle is scanned, and the image will appear virtual in the sense that rays leaving the surface of the display at any instant will be parallel. Alternatively, the laser can be kept at constant intensity and extent to which each grating is switched on when it is visible to the eye can be varied. Thus, an image can be displayed that appears to be three-dimensional.

Figure 6:
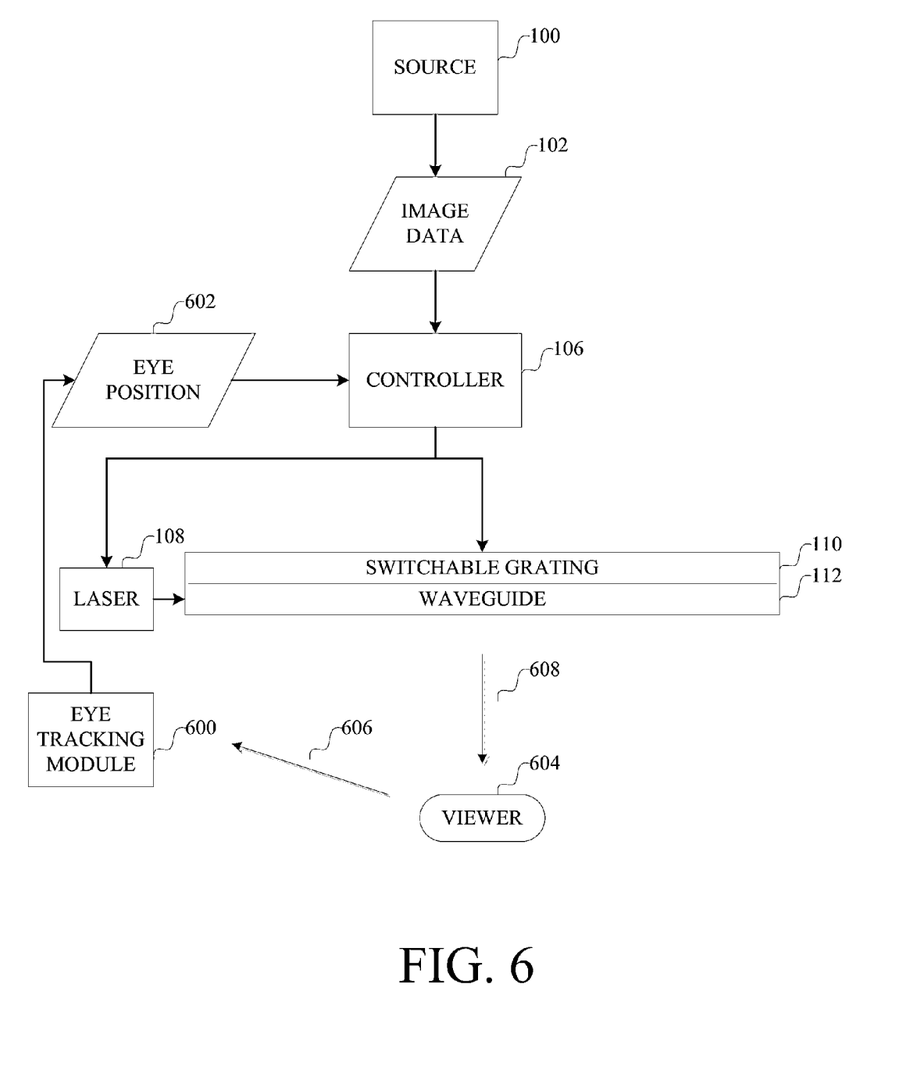
FIG. 6 is a diagram of a system incorporating eye tracking.

To modulate only those rays likely to be directed at a viewer's eye, the position of the viewer's eye can be determined using eye tracking technology. As shown in FIG. 6, an eye tracking module 600 processes images 606 of the viewer to provide data 602 indicating the eye position of a viewer 604 to the controller 106. Given the knowledge of the eye position, the launch angle, intensity and grating can be controlled so as to direct light 608 to the desired eye position. This control can be provided for each channel (left and right) of data for each eye (left and right). Note that only that part of the image for which three-dimensional simulation is desired is controlled in this manner. The remainder of the image (such as a background), can be displayed in a conventional manner.

Figure 8:
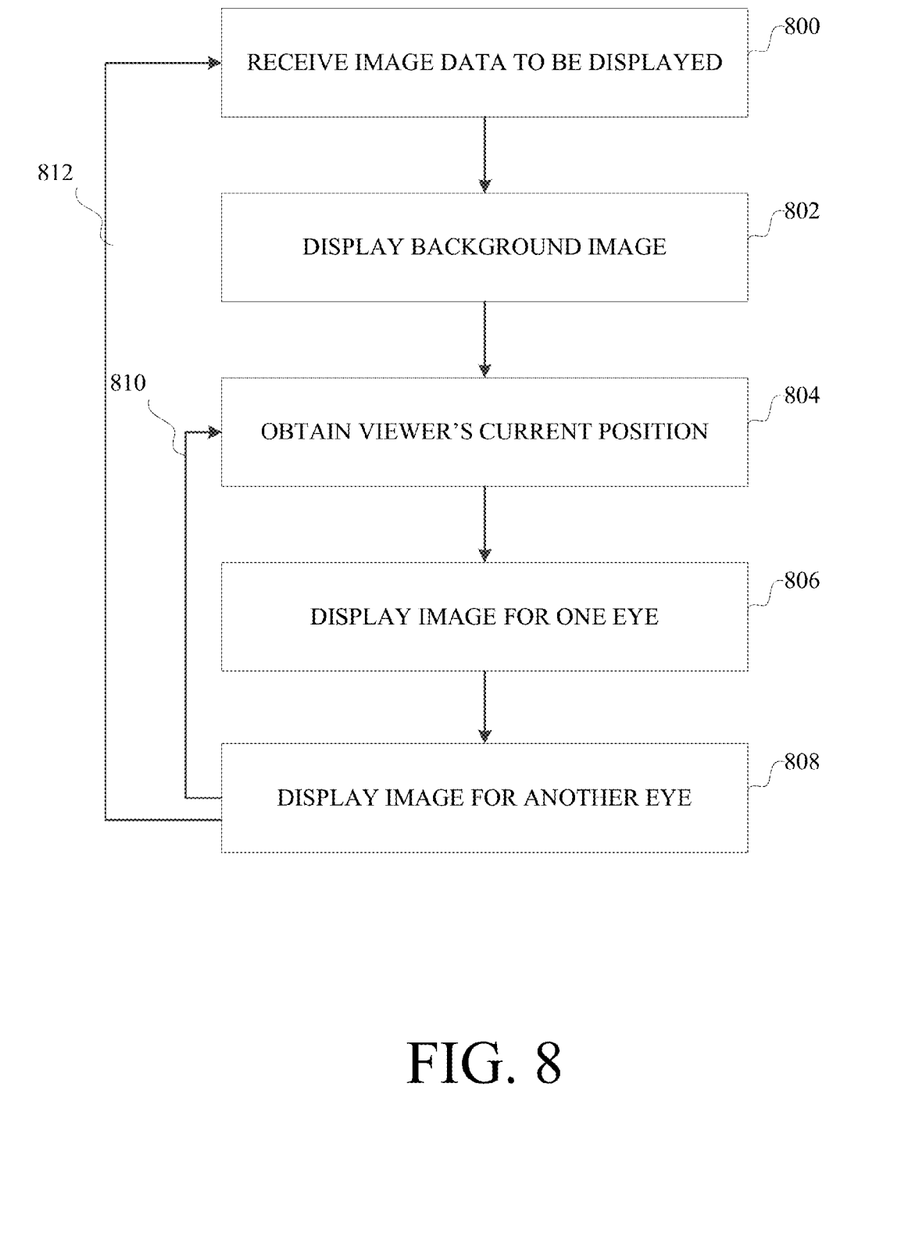
FIG. 8 is a flowchart describing a process for controlling the display system.

A flowchart describing how the controller can present a sequence of images according to a tracked viewer position will now be described in connection with FIG. 8.

The controller receives 800 the next image data to be displayed. This image may include left and right channels. Any background image data that is simply displayed without reference to the eye position is displayed 802. The viewer's current position is then obtained 804. Using the viewer's position, the first channel of data for one eye is displayed 806. Then the second channel of data for the other eye is displayed 808. This process can be repeated for multiple viewers, as indicated at 810, and for multiple images, as indicated at 812.

In another implementation, it can be useful to have a display where the image appears to come neither from the display nor from infinitely far behind the display, but somewhere in between. This kind of display can be provided by using a video hologram, which is described in PCT Publication WO9900993. In particular, a hologram can be synthesized by displaying a series of narrow-angle holograms on a liquid crystal display and illuminating it with rays of light which are parallel but in a slightly different direction for each narrow-angle hologram. By placing an LCD in front of the waveguide described herein, and displaying a narrow angle hologram on the LCD, so as to vary the distance to the point from which any part of the image appears to originate, such a display can be created.

Having now described an example implementation, a computing environment in which such a system is designed to operate will now be described. Such a computing environment can be used to implement, the controller for the display, and/or the eyetracking module, and/or the source of the image data.

The following description is intended to provide a brief, general description of a suitable computing environment in which this system can be implemented. The system can be implemented with numerous general purpose or special purpose computing hardware configurations. Examples of well known computing devices that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, game consoles, programmable consumer electronics, network PCs, minicomputers, mainframe computers, distributed computing environments that include any of the above systems or devices, and the like.

Figure 7:
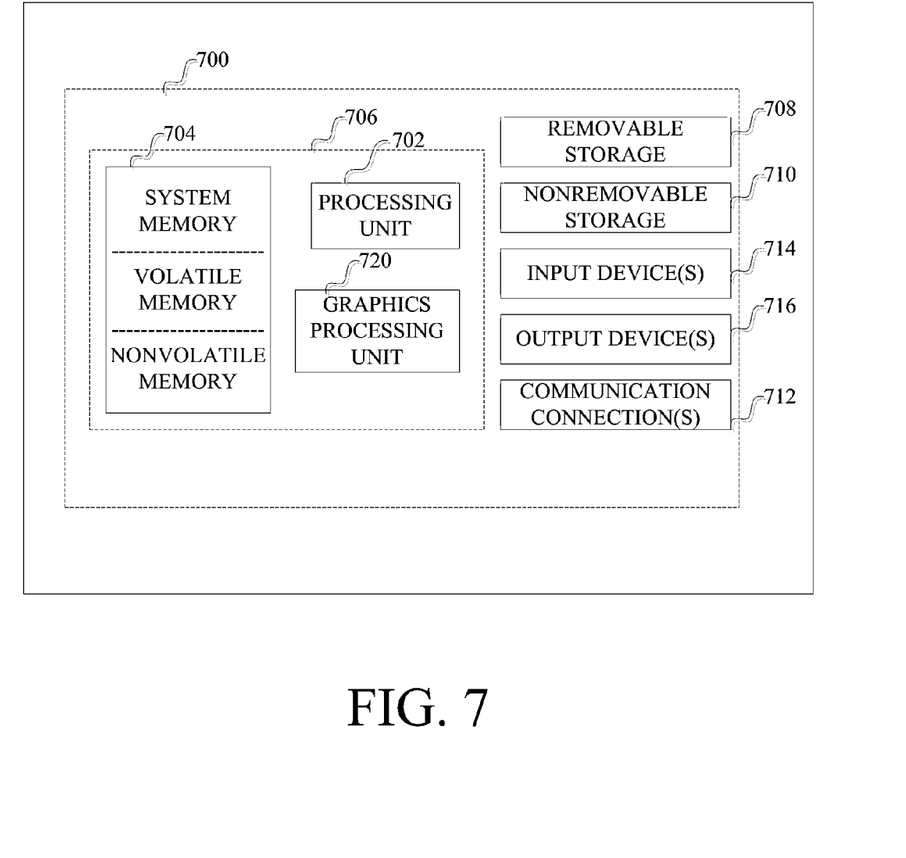
FIG. 7 is a block diagram of an example computing device in which such a system can be implemented.

FIG. 7 illustrates an example of a suitable computing system environment. The computing system environment is only one example of a suitable computing environment and is not intended to suggest any limitation as to the scope of use or functionality of such a computing environment. Neither should the computing environment be interpreted as having any dependency or requirement relating to any one or combination of components illustrated in the example operating environment.

With reference to FIG. 7, an example computing environment includes a computing machine, such as computing machine 700. In its most basic configuration, computing machine 700 typically includes at least one processing unit 702 and memory 704. The computing device may include multiple processing units and/or additional co-processing units such as graphics processing unit 720. Depending on the exact configuration and type of computing device, memory 704 may be volatile (such as RAM), non-volatile (such as ROM, flash memory, etc.) or some combination of the two. This most basic configuration is illustrated in FIG. 7 by dashed line 706. Additionally, computing machine 700 may also have additional features/functionality. For example, computing machine 700 may also include additional storage (removable and/or non-removable) including, but not limited to, magnetic or optical disks or tape. Such additional storage is illustrated in FIG. 7 by removable storage 708 and non-removable storage 710. Computer storage media includes volatile and nonvolatile, removable and non-removable media implemented in any method or technology for storage of information such as computer program instructions, data structures, program modules or other data. Memory 704, removable storage 708 and non-removable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing machine 700. Any such computer storage media may be part of computing machine 700.

Computing machine 700 may also contain communications connection(s) 712 that allow the device to communicate with other devices. Communications connection(s) 712 is an example of communication media. Communication media typically carries computer program instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media.

Computing machine 700 may have various input device(s) 714 such as a keyboard, mouse, pen, camera, touch input device, and so on. Output device(s) 716 such as a display, speakers, a printer, and so on may also be included. All of these devices are well known in the art and need not be discussed at length here.

The input and output devices can be part of a natural user interface (NUI). NUI may be defined as any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, gesture recognition both on screen and adjacent to the screen, air gestures, head and eye tracking, voice and speech, vision, touch, gestures, and machine intelligence. Example categories of NUI technologies include, but are not limited to, touch sensitive displays, voice and speech recognition, intention and goal understanding, motion gesture detection using depth cameras (such as stereoscopic camera systems, infrared camera systems, RGB camera systems and combinations of these), motion gesture detection using accelerometers, gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods).

Such a display system may be implemented in the general context of software, including computer-executable instructions and/or computer-interpreted instructions, such as program modules, being processed by a computing machine. Generally, program modules include routines, programs, objects, components, data structures, and so on, that, when processed by a processing unit, instruct the processing unit to perform particular tasks or implement particular abstract data types. This system may be practiced in distributed computing environments where tasks are performed by remote processing devices that are linked through a communications network. In a distributed computing environment, program modules may be located in both local and remote computer storage media including memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The terms "article of manufacture", "process", "machine" and "composition of matter" in the preambles of the appended claims are intended to limit the claims to subject matter deemed to fall within the scope of patentable subject matter defined by the use of these terms in 35 U.S.C. § 101.

Any or all of the aforementioned alternate embodiments described herein may be used in any combination desired to form additional hybrid embodiments. It should be understood that the subject matter defined in the appended claims is not necessarily limited to the specific implementations described above. The specific implementations described above are disclosed as examples only.

What is claimed is:

1. A display system, comprising:
a slab waveguide comprising a first conductor;
a second conductor separated from the first conductor by a gap;
a light source configured to inject light, in a direction of injection, into an edge of the slab waveguide;
a switchable grating comprising a plurality of individually addressable portions, wherein each portion is controlled individually to switch a state of the portion between a first state in which light is guided by the portion along the slab waveguide in the direction of injection and a second state in which light is diffracted by the portion out of the face of the slab waveguide in a direction substantially different from the direction of injection; and
for each portion in the switchable grating, a reservoir aligned opposite the slab waveguide and extending through an opening in the first conductor, wherein a fluid has a state such that, in a first state, the fluid is retained outside of the gap and in the reservoir and, in a second state, the fluid is drawn into the gap, wherein the state of the fluid of each portion in the switchable grating controls the state of the portion; and
a controller configured to spatially modulate the switchable grating so as to individually control, for each portion of the switchable grating, where light exits the waveguide by controlling a voltage source to apply a voltage to the first conductor and the second conductor at each portion to switch the state of the portion of the switchable grating.

2. The display system of claim 1, wherein the controller is further configured to modulate an angle of injection of the light from the light source into the edge of the slab waveguide.

3. The display system of claim 1, further comprising an eye tracking module providing an output indicative of an eye position of a viewer.

4. The display system of claim 3, wherein the controller is further configured to control the switchable grating according to the eye position of the viewer.

5. The display system of claim 3, wherein the controller is further configured to modulate an angle of injection of the light from the light source into the edge of the slab waveguide according to the eye position of the viewer.

6. The display system of claim 1, further comprising a scanning mirror which controls an angle of injection of the light into the edge of the slab waveguide.

7. A display system, comprising:
a waveguide;
a light source configured to inject light, in a direction of injection, into the waveguide;
a switchable grating comprising a plurality of individually addressable positions;
a controller configured to spatially modulate the switchable grating so as to individually control a state of each position such that, in a first state, light is diffracted at the position to exit the waveguide in a direction substantially different from the direction of injection, and, in a second state, light is guided at the position along the waveguide in the direction of injection; and
wherein each position of the plurality of positions in the switchable grating comprises:
a reservoir including a fluid having a state;
a first conductor and a second conductor;
a gap between the first conductor and the second conductor and contiguous with a face of the waveguide; and
wherein the fluid is in the gap when a first voltage is applied to the first conductor and the second conductor, and wherein the fluid is in the reservoir when a second voltage, different from the first voltage, is applied to the first conductor and the second conductor, wherein the state of the fluid at the position controls the state of the position.

8. The display system of claim 7, wherein the switchable grating and the waveguide are located on a first side of the gap.

9. The display system of claim 7, wherein the switchable grating and the waveguide are on opposite sides of the gap.

10. The display system of claim 7, wherein the controller is further configured to spatially modulate the switchable grating according to a received eye position.

11. The display system of claim 10, wherein the controller is further configured to control a scanning mirror to modulate an angle of injection of the light into the waveguide.

12. A display system configured to produce three-dimensional images using image data including data for left and right channels, the display system comprising:
a waveguide,
a light source configured to inject light based on the image data into the waveguide in a direction of injection,
a switchable grating comprising a plurality of independently controlled positions, and
a controller configured to independently spatially modulate each position of the switchable grating for each of the left and right channels by applying a voltage to conductors to move a fluid at the position between a gap adjacent the waveguide and a reservoir, wherein a state of the fluid in the gap at the position includes a first state in which light is guided along the waveguide in the direction of injection and a second state in which light exits the waveguide in a substantially different direction than the direction of injection.

13. The display system of claim 12, wherein the controller is further configured to modulate an angle of injection of the light from the light source into the waveguide.

14. The display system of claim 13, further comprising a scanning mirror that directs the light from the light source into the waveguide, wherein the controller is further configured to control the scanning mirror to modulate the angle of injection of the light into the waveguide.

15. The display system of claim 12, further comprising an eye tracking module providing an output indicative of an eye position of a viewer.

16. The display system of claim 15, wherein the controller is further configured to control the switchable grating according to the eye position of the viewer.

17. The display system of claim 15, wherein the controller is further configured to modulate an angle of injection of the light from the light source into the waveguide according to the eye position of the viewer.

18. The display system of claim 12, wherein the switchable grating comprises, for each of a plurality of positions in the switchable grating:
a reservoir including a fluid;
a first conductor and a second conductor;
a gap between the first and second conductor and contiguous with a face of the waveguide; and
wherein the fluid is in the gap when a first voltage is applied to the first conductor and the second conductor and the fluid is in the reservoir when a second voltage different from the first voltage is applied to the first conductor and the second conductor.

19. The display system of claim 12, wherein the switchable grating comprises a plurality of individually addressable portions, each portion at a position along a face of the waveguide, wherein for each position in the switchable grating, a reservoir aligned opposite the waveguide and extending through an opening in a first conductor, and wherein a second conductor is separated from the first conductor by a gap, and wherein the controller, to spatially modulate the switchable grating, is configured to control a voltage source to apply a voltage to the first and second conductors to switch the switchable grating between first and second states, wherein a fluid is retained outside of the gap in the reservoir in the first state, and the fluid is drawn into the gap in the second state.

20. A display system, comprising:
a waveguide;
a light source configured to inject light into the waveguide in a direction of injection;
a switchable grating comprising a plurality of independently controlled positions; and
a controller configured to independently spatially modulate each position of the switchable grating so as to control where light exits the waveguide at each position, wherein spatially modulating a position of the switchable grating comprises applying a voltage to conductors to move fluid between a gap adjacent the waveguide and a reservoir, wherein a state of the fluid in the gap at the position includes a first state in which light is guided along the waveguide in the direction of injection and a second state in which light exits the waveguide in a substantially different direction than the direction of injection.

21. The display system of claim 20, wherein the controller is further configured to modulate an angle of injection of the light from the light source into an edge of the waveguide.

22. The display system of claim 21, further comprising a scanning mirror that directs the light from the light source into the waveguide, wherein the controller is further configured to control the scanning mirror to modulate the angle of injection of the light into the waveguide.

23. The display system of claim 20, further comprising an eye tracking module providing an output indicative of an eye position of a viewer.

24. The display system of claim 23, wherein the controller is further configured to control the switchable grating according to the eye position of the viewer.

25. The display system of claim 23, wherein the controller is further configured to modulate an angle of injection of the light from the light source into the waveguide according to the eye position of the viewer.

26. The display system of claim 20, wherein the switchable grating comprises, for each of a plurality of positions in the switchable grating:
a reservoir including a fluid;
a first conductor and a second conductor;
a gap between the first and second conductor and contiguous with a face of the waveguide; and
wherein the fluid is in the gap or in the reservoir according to voltage applied to the first and second conductors.

27. The display system of claim 20, wherein the switchable grating comprises a plurality of individually addressable portions, each portion at a position along a face of the waveguide, wherein for each position in the switchable grating, a reservoir aligned opposite the waveguide and extending through an opening in a first conductor, and wherein a second conductor is separated from the first conductor by a gap, and wherein the controller, to spatially modulate the switchable grating, is configured to control a voltage source to apply a voltage to the first and second conductors to switch the switchable grating between first and second states, wherein a fluid is retained outside of the gap in the reservoir in the first state, and the fluid is drawn into the gap in the second state.

28. A display system configured to produce three-dimensional images, comprising:
a slab waveguide having an edge and a face;
a light source configured to inject light into the edge of the slab waveguide at a direction of injection;
a switchable grating comprising a plurality of individually addressable portions, and
a controller configured to spatially modulate each portion individually in the switchable grating so as to control where light exits the slab waveguide by controlling a voltage source to apply a voltage to each portion individually;
wherein the slab waveguide includes a first conductor and a second conductor, wherein the second conductor is separated from the first conductor by a gap;
wherein, for each portion, a reservoir is aligned opposite the slab waveguide and extends through an opening in the first conductor and light is guided along the waveguide at the portion in the direction of injection when a fluid is retained outside of the gap in the reservoir and light exits the waveguide at the portion in a substantially different direction than the direction of injection when the fluid is drawn into the gap; and
the fluid is retained outside of the gap in the reservoir in response to a first voltage applied to the first conductor and the second conductor, and the fluid is drawn into the gap in response to a second voltage applied to the first conductor and the second conductor.

* * * * *